F. BELAND.
FOLDING HORSE OR TRESTLE.
APPLICATION FILED FEB. 17, 1917.

1,298,867.

Patented Apr. 1, 1919.
2 SHEETS—SHEET 1.

F. Beland
Inventor

Witnesses
by C.A. Snow & Co.
Attorneys

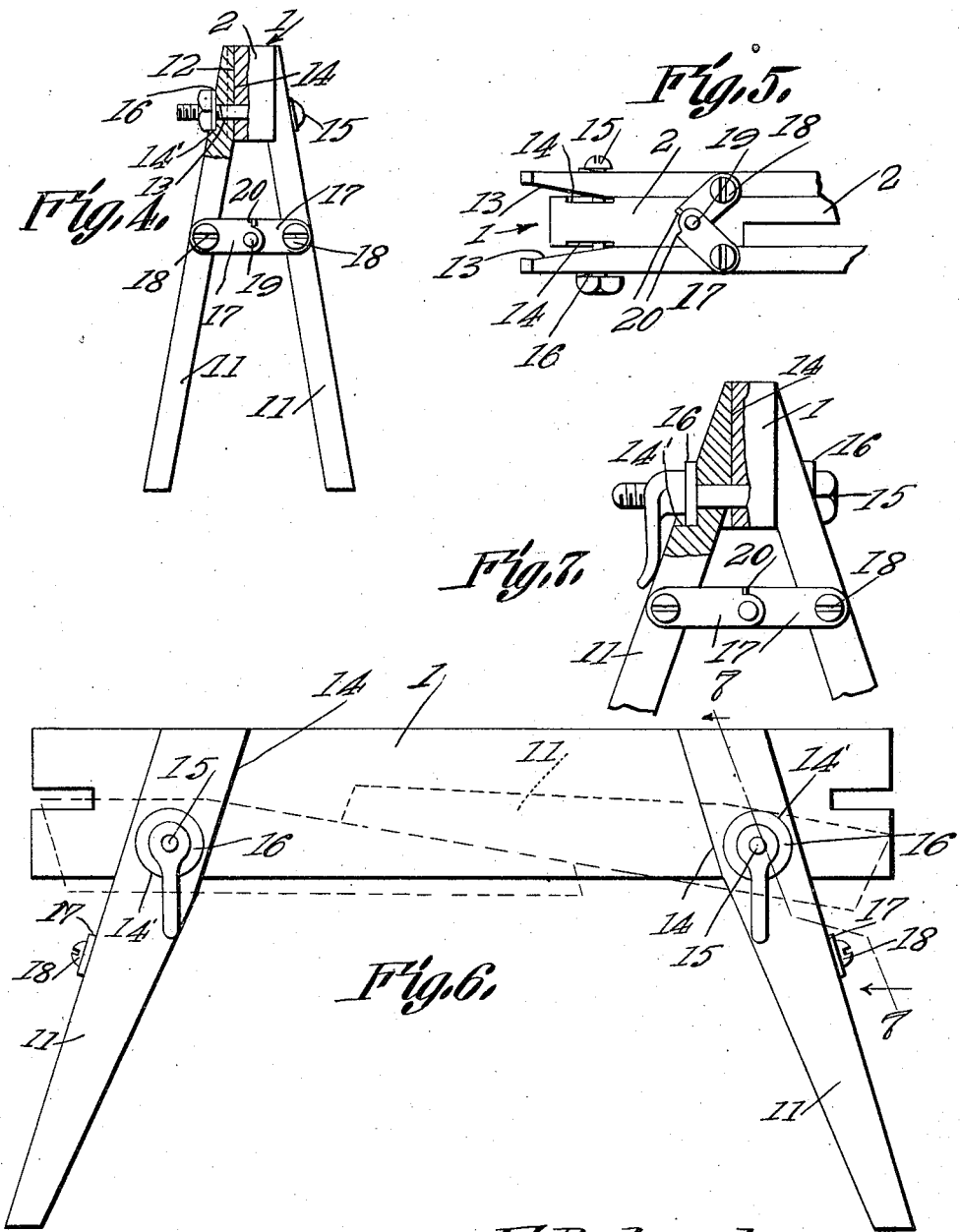

UNITED STATES PATENT OFFICE.

FRANK BELAND, OF CAIRO, ILLINOIS.

FOLDING HORSE OR TRESTLE.

1,298,867.  Specification of Letters Patent.  Patented Apr. 1, 1919.

Application filed February 17, 1917. Serial No. 149,291.

*To all whom it may concern:*

Be it known that I, FRANK BELAND, a citizen of the United States, residing at Cairo, in the county of Alexander and State of Illinois, have invented a new and useful Folding Horse or Trestle, of which the following is a specification.

The present invention appertains to horses or trestles such as used by carpenters, and aims to provide a device of that character, constructed in a novel manner to permit of the device being folded within small compass when not in use, so as to be readily stored or transported, the device being thoroughly substantial when erected.

It is also the object of the invention to provide a folding horse or trestle which is comparatively simple and inexpensive in construction, and which is serviceable and efficient in use, the device being designed for use either as a carpenter's horse or trestle, or as a part of a quilting frame or curtain stretcher.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Fig. 4 is an end view of the horse, portions being broken away and shown in section.

Fig. 5 is a fragmentary bottom plan view of the horse illustrating one pair of legs in folded position.

Fig. 6 is an elevation of a carpenter's horse embodying the principles of the invention, the legs being illustrated in folded position in dotted lines.

Fig. 7 is a partial sectional view taken on the line 7—7 of Fig. 6.

Figure 1:
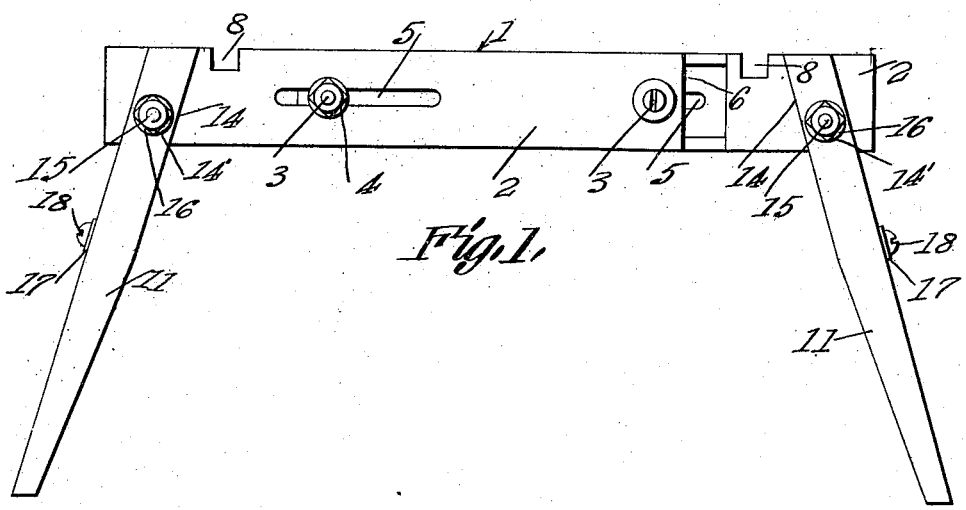
Figure 1 is a side elevation of a horse constructed in accordance with the present invention and designed for use as a part of a quilting frame or curtain stretcher, portions being broken away.
Figure 2:
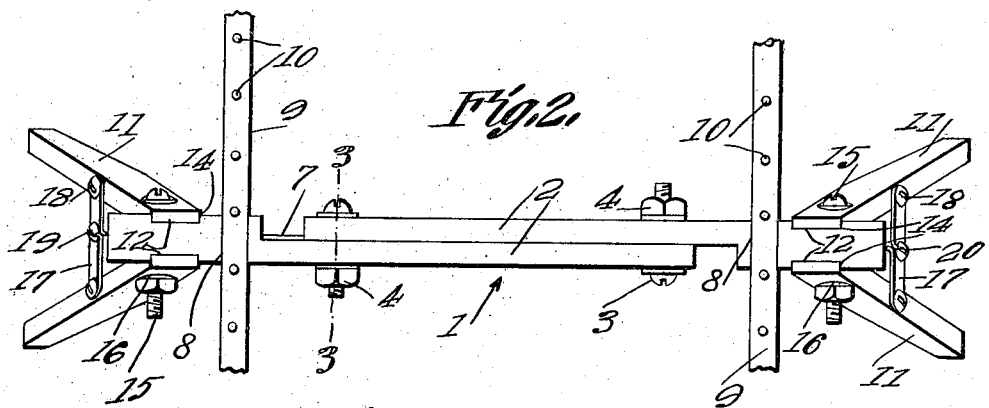
Fig. 2 is a plan view of the horse illustrated in Fig. 1.
Figure 3:
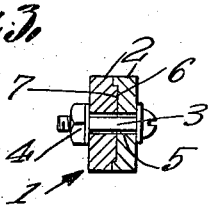
Fig. 3 is a cross section taken on the line 3—3 of Fig. 2.

Referring particularly to Figs. 1 to 5, inclusive, wherein the horse illustrated is intended especially for use as a quilting frame or curtain stretcher, the horse embodies an extensible beam 1 composed of the bars or sections 2 having their adjacent ends overlapped and adjustably clamped together by means of bolts 3 extending therethrough and having nuts 4 threaded thereon. The bars or sections 2 have slots 5 permitting of the relative longitudinal adjustment of the bars. In order to prevent the sagging of the beam 1 at the center, one bar 2 is provided with a longitudinal groove 6 receiving a longitudinal tongue 7 with which the other bar is provided. The bars are of reduced thickness where they are overlapped.

When the device is used as a quilting frame or curtain stretcher, two of the horses are employed parallel with one another, the beam 1 of each horse being provided with open slots or notches 8 in its upper edge for receiving bars 9 disposed between the two horses. These bars 9 are provided with headed pins or studs 10 for the engagement of a curtain, or a quilt applied to the bars 9. The beams of the two horses can be extended or contracted to adjust the bars 9 away from or toward one another to stretch the curtain, the bars 9 being readily applied to and removed from the slots 8.

Returning to the description of the horse *per se*, it embodies two pairs of legs 11 adjacent to the ends thereof, the legs of the two pairs diverging downwardly, and the legs of each pair also diverging downwardly. The upper terminals of the legs are cut obliquely, as at 12, to rest snugly against the sides of the beam 1, one pair of legs being applied to one bar, and the other pair to the other bar near the remote ends of said bars. The legs 11 have apertures 13 substantially perpendicular to the oblique faces 12 and located at the lower ends of said faces, and the outer sides of the legs have recesses 14'. A pivot bolt 15 extends through the apertures 13 of each pair of legs and through a suitable aperture in the beam 1, and washers 16 are preferably seated in the recesses 14' for the heads and nuts of the bolts to seat against. The opposite sides of the beam have oblique recesses 14 for receiving the upper terminals of the legs when the bolts are tightened, to hold the legs firmly in position. When the horse is not in use, by loosening, the bolts 15, the legs 11 can be swung toward one another and against the opposite sides of the beam, to provide a compact arrangement of the parts for storing or transporting the device.

As a means for maintaining the legs in separated position when the horse is erected, a pair of toggle links 17 is pivoted, as at 18, to each pair of legs 11, said links being pivoted to those edges of the legs nearest the respective end of the beam, and adjacent to the lower edge of the beam. The links 17 are provided above the pivot or joint 19 thereof with stops 20 to contact with each other and limit the downward movement of the joint when the links are straightened out downwardly into substantially a straight line or with the joint slightly below a straight line connecting the pivots 18. Thus, when the legs of each pair are swung apart, this will straighten out the links 17. The links 17 act as a stay to hold the legs of each pair separated, and said links act as stops to strike the beam 1 and limit the movement of the legs around the holes 15 when swung to folded position against the opposite sides of the beam as seen in Figs. 5 and 6. When the legs are folded, the toggle links 17 are adapted to fold, as illustrated in Fig. 5.

When the horse is constructed for use by carpenters and other artisans, it is preferably made stronger in construction, as illustrated in Figs. 6 and 7, and the extensible feature of the beam is omitted.

Having thus described the invention, what is claimed as new is:

A folding horse comprising bars having reduced, adjustably connected lapping portions forming a beam having notches for the reception of connecting bars, there being oblique recesses in opposite faces of each bar of the beam, legs arranged in pairs and receiving the beam between the upper ends thereof, said ends being detachably seated in the oblique recesses, bolts extending through the beam and recesses and detachably engaging the end portions of the legs, there being a bolt receiving bore and a counterbore in each leg, each bolt being loosely mounted in its bores, each bolt having a head at one end, a nut on the other end of each bolt, washers fitted snugly in the counterbores to hold the bolts centered in the bores, said washers being held by the heads and nuts on the bolts, said washers being removable from the counterbores without detaching the nuts, to permit the legs to be withdrawn from the recesses and to be swung against the sides of the beam, and links connecting the legs of each pair, said links being movable against the beam to limit the swinging of the legs relative to the beam during the folding of the horse.

In testimony that I claim the foregoing as my own, I have hereto affixed my signature in the presence of two witnesses.

FRANK BELAND.

Witnesses:
 J. W. BROWN,
 M. J. HURT.

Copies of this patent may be obtained for five cents each, by addressing the "Commissioner of Patents, Washington, D. C."